Oct. 25, 1966    D. W. VAN DOORN ET AL    3,280,474
PROCESS AND APPARATUS FOR MOISTURE CONDITIONING SEED
COTTON AND LIKE MATERIALS
Filed Oct. 1, 1963    3 Sheets-Sheet 3
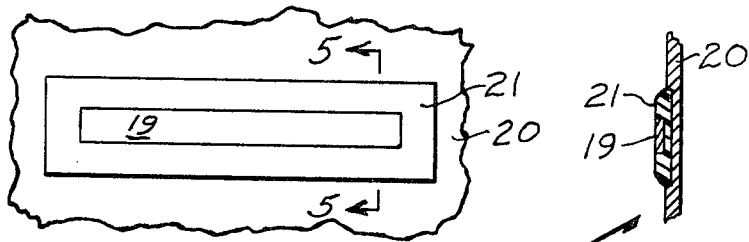
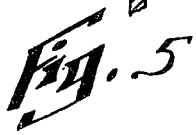
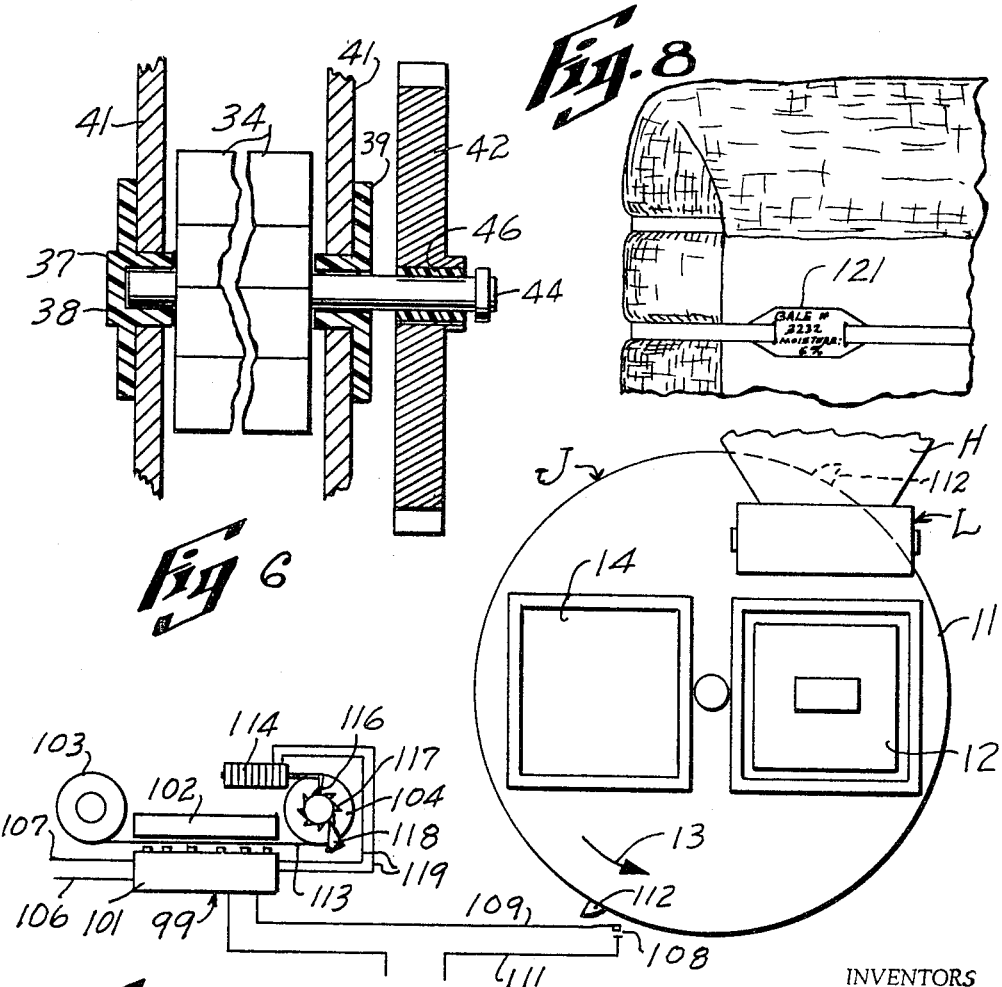
INVENTORS
Donald W. Van Doorn
William C. Pease III
Jack H. Tinkler
By Jennings Carter & Thompson Att'ys

United States Patent Office 3,280,474
Patented Oct. 25, 1966

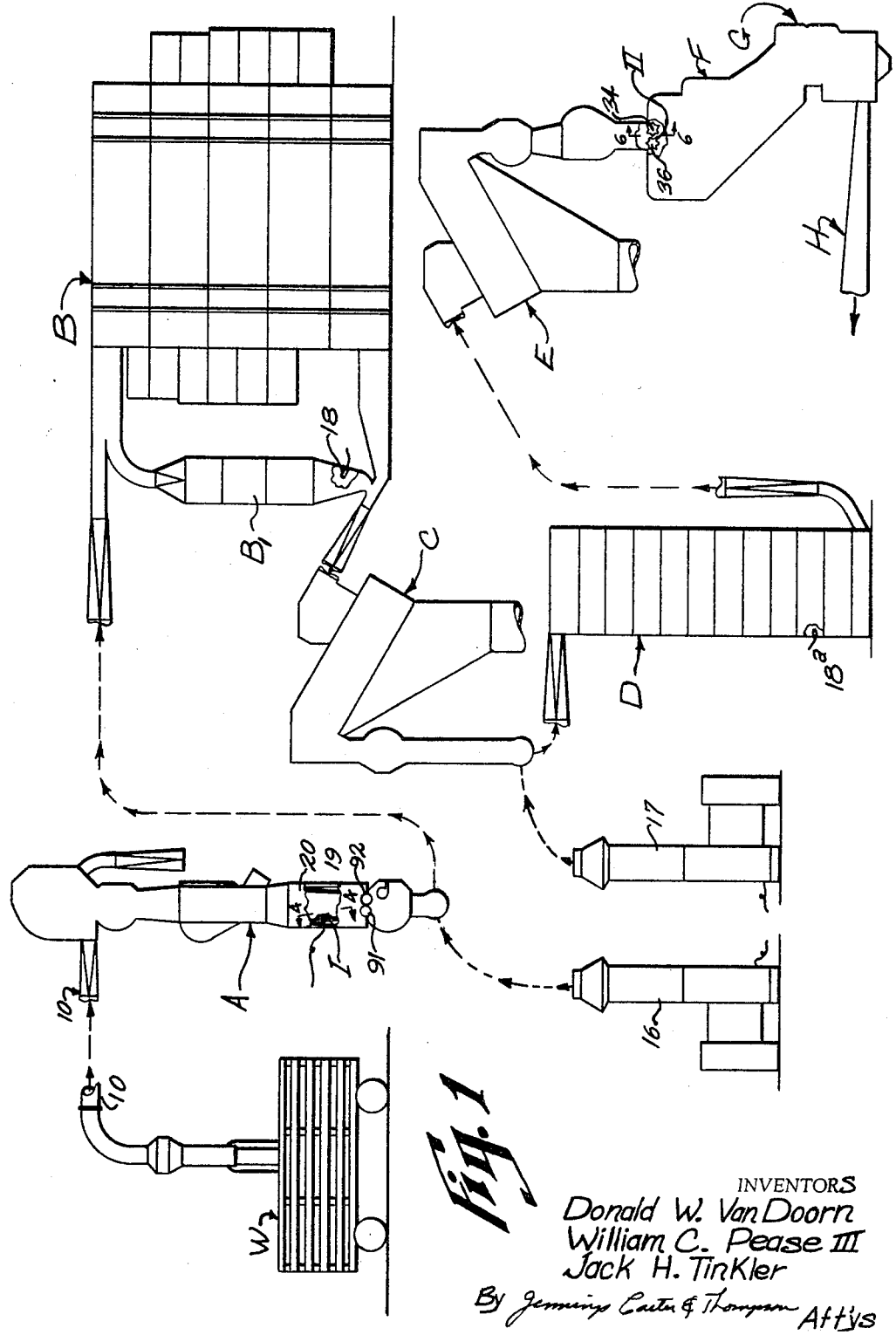

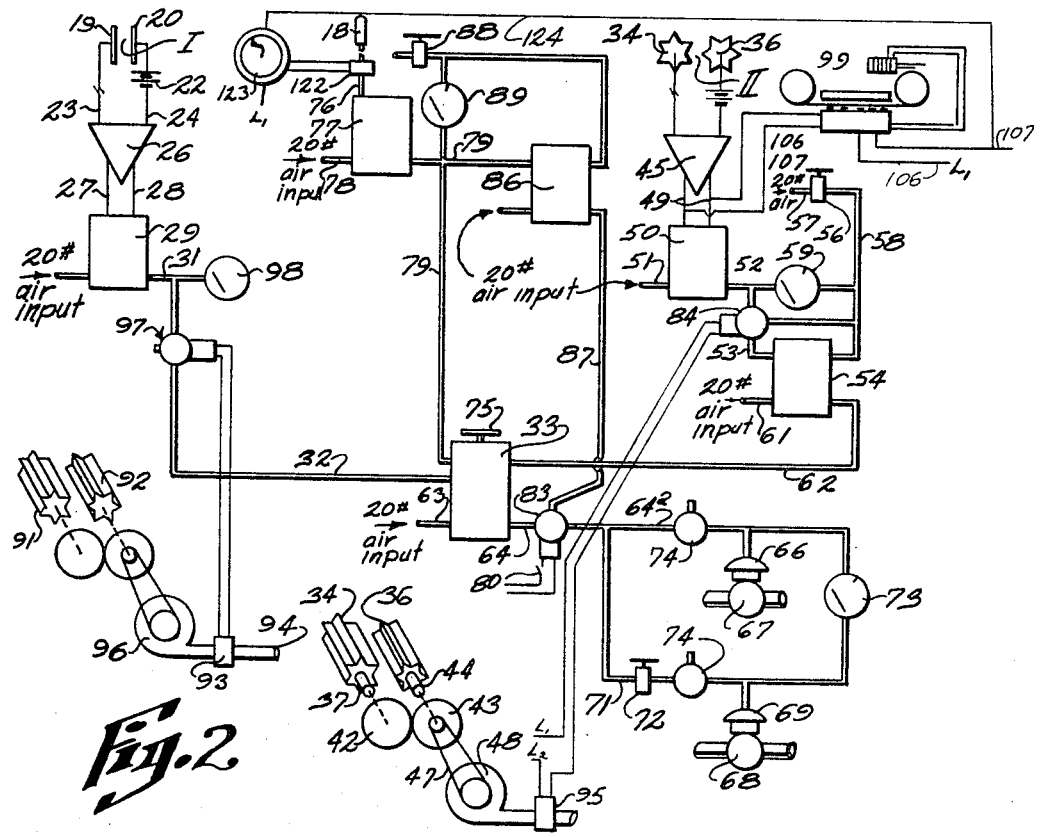

3,280,474
PROCESS AND APPARATUS FOR MOISTURE CONDITIONING SEED COTTON AND LIKE MATERIALS
Donald W. Van Doorn, William C. Pease III, and Jack H. Tinkler, Columbus, Ga., assignors to Lummus Cotton Gin Company, a corporation of Georgia
Filed Oct. 1, 1963, Ser. No. 313,096
18 Claims. (Cl. 34—31)

This invention relates to a process and apparatus for treating seed cotton and like materials so that cotton passed through the apparatus contains, within a predetermined narrow range, a desired percentage of moisture.

Heretofore in this art attempts have been made to control the moisture content of seed cotton, for instance, during its passage from the wagons to the gins, by sensing the temperature of the cotton at the discharge point of the system. Other attempts have been made to control the moisture by sensing the temperature of the drying air at a multiplicity of points in the apparatus, thus to obtain a temperature drop between two or more such points. The principle of operation of such prior systems is that as the moisture evaporates from the cotton into the air of the drying systems, the temperature of such air is lowered. The difficulties with the prior systems which sense a temperature drop as stated is that the systems tend to "wind up," that is, when the drop in temperature calls for more heat in the system the increased input itself causes a greater temperature drop, which in turn calls for a further increase in heat input, etc. Further, the prior systems under discussion are slow in responding to moisture content of the cotton as it leaves the system. This is due to the fact that the metal in the drying system absorbs from the air therein a disproportionate part of the heat compared to that absorbed by the water being evaporated from the cotton. For instance, in a typical cotton ginning system it will take approximately 10 minutes for the dryers to cool 100° even after the burners are completely shut off. During this time in a modern gin plant, some three bales of cotton would have been ginned. Such prior systems, overall, leave much to be desired with respect to moisture conditioning cotton consistently and within a desired range of moisture content.

Prior art systems where attempts are made to control the moisture content of the cotton coming from the system by sensing the moisture only at the inlet of the system have the prime disadvantage that there are many conditions which vary the amount of drying done at a given gas valve setting. In this system the single moisture sensing means is incapable of correcting for these varying conditions. For instance, if the rate of flow of the cotton through the drying system varies, as it usually does in practice, from one wagon of cotton to another, or for other reasons, a given gas valve setting will overdry cotton being fed at a slow rate, while it may underdry that being fed at a faster rate. Ambient temperature variations also affect the efficiency of this system. Still further, the high specific heat characteristics of the metal forming the duct work of the system has a material effect on the actual drying accomplished, the metal giving up heat to the cotton when it is hotter than the air surrounding the cotton and taking up heat when it is cooler than the air surrounding the cotton.

It likewise has been proposed to attempt to moisture condition cotton by sensing the moisture content of the cotton after it leaves the drying system. While this system is capable of compensating for many of the variables mentioned above there are shortcomings in such outgoing moisture detection systems. Since there are sudden changes in the moisture condition of the cotton, sensing this condition as it emerges from the system cannot effectively be employed to anticipate the changes and the system "hunts."

In view of all the foregoing the primary object of our invention is to provide a process and apparatus for moisture conditioning cotton by which, in a predictable, constant way, seed cotton delivered to a drying system emerges therefrom with a moisture content controlled within a narrower range than has heretofore been possible.

Another object of our invention is to provide a process of the character designated in which the drying requirement of the cotton is sensed prior to leaving a drying system, thus to provide an anticipatory signal, and to sense the moisture content of the cotton after it has passed through the drying system, thus to obtain a "hindsight" signal, and then to utilize a combination of these signals to control the amount of drying, thus to eliminate or substantially minimize the uncontrollable variables heretofore experienced in prior systems.

Another object of our invention is to provide a process and apparatus of the character designated in which the sensors automatically become operative at the proper time, and automatically become inoperative at the proper time, one relative to the other, thus to compensate for unevenness of flow in the system and to compensate for the condition in which the system is being emptied of cotton. Thus, in our improved process and apparatus the sensors automatically give their signals in response to the presence of cotton in the dryer and in an amount reflecting the moisture condition of the cotton, while at the same time the appropriate one thereof is automatically removed from the control system when cotton is not present, in such way that the control functions of the other sensor or sensors are not disrupted or impaired.

A more specific object of our invention is to provide a process and apparatus of the character designated in which, upon cessation of cotton flow past the final moisture sensor, the signal from the final moisture sensor will be automatically maintained at the value existing at the moment cotton ceased flowing past said sensor.

A still further specific object of our invention is to provide a process and apparatus of the character designated in which the amount of heat supplied in the dryer will be automatically reduced when cotton is not being fed into the system.

Another object is to provide an improved process for moisture conditioning cotton in which the moisture content of the cotton is sensed prior to or during the drying operation, and after the drying operation, and the temperature of the air at the discharge of the dryer is also sensed, and these signals are combined in a manner to regulate the entire system, all to the end that cotton discharged therefrom contains the desired percentage of moisture.

Another object is to provide a process of the character designated in which one, some, or all of the signals obtained throughout the system and which may be meaningful information in marketing channels or otherwise, are correlated to the respective batches or bales of cotton processed.

Another object is to provide apparatus for moisture conditioning cotton which includes means for electrically determining the moisture content of the cotton before or during its passage through the dryer and after it passes through the dryer, together with means to combine these signals for the purpose of modulating the amount of drying accomplished as the cotton passes through the system, all to the end that the amount of moisture in the cotton coming from the system falls within a desired, narrow range.

Another object is to provide, in combination with the sensing means just mentioned, means to sense the temperature of the air at the discharge of the dryer, together with means to utilize this reading of temperature to compensate for the variable occasioned by the fact that the metal walls of the dryer may either take heat from the air used to dry the cotton, or supply heat thereto, thereby affecting the final moisture content of the cotton. Thus, our temperature sensor senses two things:

(1) The amount of drying that has taken place in the dryer, and (2) The combination of the quantity of cotton passing through the dryer and its moisture content.

Another object is to provide apparatus which is fully capable of carrying out the foregoing process.

A further and more general object of our invention is to provide apparatus which is simple of construction, and extremely simple in operation, and particularly one in which the sole operation after start up required of the operator is to set one control mechanism to the desired final moisture content of the cotton, thus assuring that the cotton is ginned in the optimum condition to meet the market demands.

A further object of our invention is to provide an apparatus of the character designated which, when placed in a modern gin plant, is substantially attention-free on the part of the operator in the sense that once started and adjusted or set to a desired moisture content the operator is free to attend to the various other duties of operating the plant, thus eliminating the errors which otherwise would be occasioned by inattention to the moisture control apparatus.

A further object of our invention is to provide a process and apparatus which is especially adapted to deliver to the gin stands seed cotton which contains the optimum amount of moisture for fiber quality preservation through the ginning process, it being presently recognized that the moisture content of the cotton has a great effect on fiber damage during the ginning thereof.

A still further object of our invention is to provide means, preferably associated with the usual baling press and electrically or otherwise connected with a recording device, whereby a continuous, permanent record may be made of the moisture and temperature conditions of each bale of cotton passing through the entire gin plant. Such record conveniently may be maintained at the gin house or, if desired, may be transcribed onto a card or the like and physically accompany each bale.

Apparatus illustrating the constructional features of our invention and which also is satisfactory for carrying out our improved process is shown in the accompanying drawings, forming a part hereof, in which:

FIG. 1 is a wholly diagrammatic view of a typical gin house plant including the cotton cleaning and drying machinery and a diagrammatic showing of a gin stand;

FIG. 2 is a diagrammatic view of the pneumatic control circuit together with a portion of the electrical circuit;

FIG. 3 is a front elevational view of a control panel which may be employed with our invention;

FIG. 4 is a fragmental detail view taken generally along line 4—4 of FIG. 1;

FIG. 5 is a detail sectional view taken generally along line 5—5 of FIG. 4;

FIG. 6 is an enlarged, detail fragmental view taken generally along line 6—6 of FIG. 1;

FIG. 7 is an enlarged view of an electrical recording mechanism for correlating, in record form, the moisture content of the bales or batches of cotton processed through the plant; and, FIG. 8 is a fragmental side elevational view of a bale of cotton having attached the record derived from the recording apparatus.

Referring now particularly to FIG. 1 we illustrate our invention in association with the type of seed cotton handling and processing machinery which may be found in a modern gin plant. Thus, at A we illustrate a separator together with an automatic suction control device and storage hopper. The cotton from the wagon W is delivered to the apparatus A through the usual suction pipe 10. The cotton next passes as indicated by the arrows to a dryer which may be a high volume cotton dryer, indicated generally by the letter B. From the dryer B the cotton passes to a cleaner C, thence to a second dryer D which may be of the tower type, thence to another cleaner and separator E, through an automatic feeder F, and thence to the gin G. As will be understood, the lint is removed from the seed by the gin G, and the lint is delivered by each gin through a flue H where the lint cotton may be sent through various types of after cleaners, thence to a condenser L, FIG. 7. As is understood, the lint is condensed by the condenser L, is fed into one box 11 of a double box press indicated generally by the numeral J, a tramper 12 being indicated diagrammatically over the box being filled. Further, and as also is understood, when the press box 11 is filled the entire press framework rotates in the direction of the arrow 13, thus to bring the empty box 14 underneath the tramping and filling mechanism.

The parts so far described are standard in the art and may be varied greatly. For instance, if desired, the second dryer D may be eliminated in its entirety whereupon the cotton will go from the unit C directly to the overhead feeder F. It will further be understood that the cotton is pneumatically conveyed from one machine to the other. Hot air is introduced into the system by means of the liquid or gaseous fueled burner units indicated at 16 and 17 and as will presently appear it is the control of the amount of heat output of these units, at the proper time and in the proper amount, with which our invention is more particularly concerned.

As illustrated in the drawings we propose to sense the moisture in the cotton at a point in the system before the cotton enters the dryer B. Such point is indicated by I. We also propose to sense the moisture in the cotton after the same has gone through the last dryer of the system, whether there be one or a plurality of the same, at the point which may be located at II. Additionally, we propose to sense the temperature of the air which has been used to dry the cotton as for instance by inserting a temperature responsive probe 18 into some part of the dryer B preferably near the discharge thereof so as to be contacted by the hot air which actually is doing the drying of the cotton. As will be appreciated, the temperature reflected by the probe 18 bears a relation to the amount of moisture which has been evaporated from the cotton by the hot air. However, and for the reasons already stated above, merely using the temperature reading of such air is not wholly effective to control the drying system.

In carrying out our invention we prefer to sense the moisture content of the cotton at the points I and II by sensing the electrical characteristics of the cotton as those characteristics are effected by the moisture content of the cotton. In practice, we mount inside the storage hopper portion 20 of the unit A a plate 19 which is electrically insulated from the side walls of the storage hopper 20 by means of a sheet of insulating material indicated at 21 in FIGS. 4 and 5. By this means we are able to use the entire sheet metal framework of the unit A as one side of the electrical circuit. Therefore, when cotton is present in the storage portion 20 of the unit A it lies between the plate 19 and the side walls of the housing, thus to lie between two electrical conductors as indicated diagrammatically in FIG. 2. By impressing a potential across the plate 19 and the housing 20 from any suitable source, indicated diagrammatically as a battery 22, current flows in the leads 23 and 24, in accordance with the moisture content of the cotton. The actual current flow may be on the order of a few microamperes, but its value is a function of the moisture content of the cotton. This signal is passed to an amplifier 26. Through leads 27 and 28 the output of the amplifier controls a transducer 29 which conveniently may be a Model 77–3 transducer manufactured by Moore Products Company, Philadelphia 24, Pennsylvania. The transducer 29 is of the type to change the output signal from the amplifier 26 to an air signal proportionate in pressure to the current received. The range of the transducer in pneumatic pressure may be 3 to 15 pounds output. Also, this type of transducer may operate on a 20 pound air pressure input as indicated in FIG. 2. Thus, and as so far described, it will be seen that the air pressure output in the line 31 leading from the transducer 29 is substantially proportional to the moisture content of the cotton at point I.

The signal pressure from transducer 29 is sent through a line 32 to a multi-function relay, sometimes called a computer relay, indicated at 33. Relay 33 may conveniently be a Model 68–1 relay manufactured by the above named Moore Company. The function and purpose of the relay will be more fully described later.

At the point II we obtain a second moisture condition reading of the cotton. This may be done by isolating one of the feed rolls 34 from the other feed roll 36 in the feeder. As shown particularly in FIG. 6, the shaft 37 of the feed roll 34 is mounted in bearings 38 and 39 of insulating material such as nylon at the place where the shaft passes through the housing walls 41 of the feeder. Further, the roll 34 is driven by means of a gear 42 which may conveniently be in mesh with a similar gear 43 which is fastened on the shaft 44 of the feed roll 36. In order to complete the isolation of the roll 34 a bushing 46 of insulating material such as nylon is interposed between the hub of the gear 42 and the shaft 37. The gear is made fast to the shaft 37, through the bushing, by any suitable means, whereby when power is applied to the shaft 44 through a belt or the like indicated at 47, the feed rolls 34 and 36 are driven in opposite directions, thus to drop the seed cotton down into the feeder. In practice, we employ a hydraulic motor indicated at 48 to drive the shaft through the belt 47 as indicated.

In a manner very similar to that already described with respect to the plate 19 and the side of the housing 20, we obtain a microamp signal between the isolated roll 34 and the roll 36 which is mounted in ordinary bearings in the housing walls 41. This signal is fed into an amplifier 45 and the output of the amplifier 45 is passed through leads 49 to another transducer 50 which may be identical with the transducer 29 already described.

In similar manner to the transducer 29, transducer 50 is supplied with a 20 pound air input through the line 51. The output air pressure signal, which varies substantially in proportion to the signal across the rolls 34–36 is taken by a line 52 where it is impressed through a line 53 to one input side of a differential pressure controller 54. The unit 54 may conveniently be a model 50 W "Null-matic" controller manufactured by the above identified Moore Company. At 56 we indicate a manually settable regulator, which may conveniently be a model 41–15 regulator manufactured by the above identified Moore Company. On one side of the regulator 56, through a line 57 is impressed the standard 20 pound air pressure signal. The adjustment of the regulator maintains in the output line 58 therefrom an air pressure signal which is impressed both on the unit 54 and on one side of a duo-gauge 59. The output pressure signal in line 52 from transducer 49 is also impressed on the gauge 59 as indicated.

The controller 54 has impressed on its input side through line 61 the standard 20 pound pressure. Through the means shown controller 54 produces in line 62 an air pressure signal which is substantially a function of the pressure difference in lines 52 and 58, it being remembered that pressure maintained in line 58 is manually determinable by the setting of the regulator 56.

Referring again now to the computer relay 33 it will be seen that pressure from the lines 32 and 62 is impressed thereupon. The input to the computer 33 is the standard 20 pound pressure through line 63. Except as will be hereinafter mentioned, the computer 33 is effective to deliver to the line 64 a signal which is substantially proportional to the sum of the signals received by it through lines 32 and 62. The pressure signal in line 64 is led through a line 64ª to a pneumatic controller 66 for a gas valve 67 which controls the flow of gas to the gas heater 16. The controller 66 is of the modulating type, whereby the setting of the valve 67 varies quite uniformly from full open to full closed position, thus accurately to control the amount of heat output of the heater 16.

The valve 68 for the heater 17 likewise is controlled by a modulating pneumatic controller 69 which derives its pressure from the line 64ª through a branch line 71. At 72 we indicate a manually settable pressure regulator which may be used to cause the burner 68 to receive more or less fuel than burner 67 as may be desired. Also, at 73 we indicate a duo-gauge, one reading of which indicates the setting of valve 67 and the other of which indicates the setting of valve 68. At 74 we indicate the usual automatic safety valves which are employed when igniting the burners controlled by valves 67 and 68, thus to be sure that neither of the valves are full open in response to signals which might be received in the pressure lines.

From what has been so far described it will be seen that the purpose and function of the mechanism set forth will be to open or close the valves 67 and 68, in modulating fashion, strictly in accordance with a combination of the signals derived from the moisture sensors at the points I and II. These signals are additive in the computer relay 33 except as they may be modified by a manually settable control on the relay 33 indicated at 75. Therefore, the signal received prior to the cotton entering the hot air dryers is used in combination with the signal received after the cotton has been dried so that the former signal is used to "anticipate" the drying needs of the cotton later on in the system, while the latter is used to influence the drying by "hindsight."

As has been before stated, under some conditions when cotton is passing through the system, as for instance when a load is being run out, the walls of the chambers making up the drying system tend to give off heat to the cotton in an excessive amount. This varies with respect to the rate of flow of the cotton as well as with respect to the quantity of cotton flowing at any given time. Therefore, we feed into the computer relay 33 a signal which is responsive to the temperature of the air which has just been used to dry the cotton, (or alternately, at the time is being used to dry the cotton) and taken from a point such as 18 or 18ª (preferably 18), that is, a point in the system where the hot air has at least partially dried the cotton. By way of example we may insert into the bypass portion B–1 a pressure type, temperature responsive probe or bulb 18. The signal from this probe leads through a pressure line 76 to a temperature transmitter 77 which may be a model 33–B unit manufactured by the aforesaid Moore Products Company. The standard air input of 20 pounds, introduced to the unit 77 through the line 78 is brought to the pressure system operating range by the unit 77. Through a line 79 the output air pressure signal from the unit 77 is fed to the computer 33. Since the signals received from the points I and II always are sufficient, unless decreased, to set the valves at least to the maximum opening, the purpose and function of the temperature signal from the probe 18 is to decrease the valve opening effect of signal from points I and II in those instances where too much heat is being delivered to the cotton due to the residual heat of the side walls of the chambers. Thus, signals from points I and II are additive, whereas any signal received through the line 79 decreases the valve signal by a proportionate amount, thus further to regulate the setting of the gas valves for the heaters.

In order to bring the system up to the proper temperature for drying, it is necessary when first starting up to eliminate from the system the valve setting effects of the moisture content signals at the points I and II. We accomplish this by manually operating a switch 80 thereby actuating valve 83 and closing line 64 and connecting line 87 to line 64ª. Thus, the relay 33 is removed from control over the valves 67 and 68 and the signal produced by the temperature sensor 18 is fed through a temperature controller 86, similar to the moisture controller 54 through a line 87, through valve 83 and thence to the burner control means 66 and 69. Thus, with no cotton in the system as, for instance, when it is desired to bring the system up to temperature, only the signal produced by the temperature sensor 18 is effective to determine the setting of the gas valves. By means of a manually settable regulator 88 this temperature may be predetermined and the same is indicated on a duo-gauge 89. The actual temperature in the dryer is also shown on the gauge 89, and where two drying systems are used the temperature of the air in the second dryer may be shown on another gauge, 90, FIG. 3.

After the system has been brought up to temperature and just before cotton enters the system the operator manually operates switch 80 thereby changing from the temperature control, just described, to our automatic control system.

In order to prevent a premature signal from point I in the system, when cotton is in the storage hopper 20 but is not being fed to the system, we provide the means now to be described and which is associated with the feed rolls 91 and 92 at the bottom of the storage hopper 20. Thus, we place a pressure switch 93 in the line 94 supplying fluid under pressure to a fluid motor 96 for rotating the rolls 91 and 92. With no cotton being passed through the rollers 91–92 switch 93 is open; upon an increase in load due to the presence of cotton switch 93 closes, in turn energizing a solenoid valve 97 which is normally vented to atmosphere. Thus, it is only during those times when cotton is being fed through the rolls 91 and 92 that the signal across the point I is applied to the system.

In order to give a visual indication of the moisture content of the cotton at the point I we provide a gauge 98 which is calibrated to read the pressure coming from the unit 29 in terms of moisture content, percentagewise.

Furthermore in the interim after one batch of cotton has been processed and has gone past point III and before the first portion of a following batch reaches point II it is desirable to maintain a continuous signal from the final moisture control point II to the computer relay 33 in order to maintain the continuity of the control signal from the relay 33 to the burner control means 66 and 69. This is done by the means now to be described. We provide a switch 95 which is responsive to the flow of cotton past point II. Upon flow of cotton past point II switch 95 is effective to cause solenoid valve 84 to connect lines 52 and 53 whereby the signal from the sensor at point II through the transducer 50 is fed to the moisture controller 54. Thus the signal from 54 to the computer 33 is responsive to change in moisture content of the cotton at point II. When cotton ceases to flow past point II switch 95 is effective to cause solenoid valve 84 to connect lines 53 and 58 whereby the manually set pressure in line 58 is impressed on both sides of the controller 54 whereby there is no difference in the signals on either side of the controller 54 and the output signal fed into line 62 remains the same as it was at the instant the cotton ceased flowing past point II. Thus in our system we utilize the final moisture signal from point II every possible moment, and in the short interim between batches we provide means to maintain continuous, smooth control of the burner output.

In order to keep a running record of the moisture content correlated to the respective batches or bales of cotton passing through the system we may provide the recording means now to be described.

In FIG. 7 we indicate diagrammatically an electric printing device 99. This device consists essentially of the printing portion 101 proper, a platen 102, a tape feed system embodying a supply reel 103 and an intermittently driven takeup reel 104. Preferably, though not necessarily, we propose to cause the mechanism to print the moisture content together with the bale number on the tape in response to turning of the press J, upon completion of the filling of the box.

Through the medium of electric leads 106 and 107 which may conveniently derive their signal from the amplifier 45 the printing mechanism of the unit 99 is set to print both the bale number and the moisture content of the particular bale. In other words, the actual printing indicia are indexed in response to the signals received through the lines 106 and 107.

At 108 we show a switch which controls lines 109 and 111. The switch may be located in such position relative to the press table as to be closed by a lug 112 when the press rotates. Feed means for the tape 113 on which the record is to be made may be in the form of a solenoid driven ratchet mechanism for rotating the takeup reel 104. Thus, a solenoid 114, carrying a detent 116 on the end of the armature may engage a ratchet 117 on the shaft carrying the takeup reel 104. A pawl 118 prevents reverse movement in a manner well understood. The signal to energize the solenoid 114 may come through lines 119 from the printing mechanism 101. It will be understood that power is supplied to the system through the usual power input lines, some of which are indicated by L–1 and L–2 in the drawings.

In FIG. 8 we show a fragment of a bale of cotton to which we have applied a tag 121 carrying the moisture information relative to a given numbered bale.

From the foregoing the method of carrying out our improved process and of constructing and using our improved apparatus may now be explained more in detail. As has been stated, the rationale of our invention revolves around moisture conditioning cotton through the medium of signals obtained both before and after subjecting it to the drying action. If desired, we may further modify these signals by means of a temperature signal obtained from the drying air, this being representative of the amount of drying done at the point in question. With cotton passing through the system the moisture condition at point I is sensed in order to influence the setting of the dryer burners. Standing alone, however, this signal is insufficient; it is only after we obtain the signal from the point II and combine these signals are we effectively able to assure that the moisture content of the cotton coming to the gins falls within a very narrow, predetermined range. By sensing the moisture content of the cotton at points I and II electrically, we obtain a more accurate indication of the actual moisture content and when these two signals are brought together we have discovered that a very close control can be obtained over the heat required throughout the entire system. Thus, any variation in moisture content at the point II toward the wet end of the scale calls for more heat from the burners; conversely, any variation of the moisture content at point II toward the dry end calls for less heat. The same functioning applies to the sensing means at point I. At point I we obtain what might be called a "present" signal representative of the moisture content of the cotton at that point. At point II we obtain a signal which is responsive to a differential toward wet or dry, from a desired moisture content. The moisture control effected at point I, of course, senses immediately the need or lack of need for heat and sets the valves accordingly. The signal obtained at point II modulates this signal in accordance with the accuracy of the signal produced at point I, thus preventing any sudden changes throughout the entire system. The temperature sensor 18 further modifies the signal to reduce the temperature when the walls of the chambers tend to give up more heat to the cotton than it should have, as when a load of cotton of relatively high moisture content has just been run through the system, and is followed by a second load of lower moisture content. It is to be understood that when we use the terms "heat requirement," or "heat input," or similar terms, we imply the use of alternative terms such as drying effect, drying requirement, exposure time, and the like.

The safety features and recording features of our invention find practical application in completely automating a gin plant. By correlating the final moisture content, or, for that matter, the initial moisture content and/or drying temperatures employed, if desired, of each bale we provide ready means for maintaining accurate records. Buyers of cotton apparently are coming to the point that they insist upon their cotton having been ginned at a given moisture content and hence this information is valuable in the market place. Of course, and as shown in FIG. 8, this information may be physically affixed in suitable manner to each bale, so that it accompanies the bale to the purchaser. If desired, a temperature record can be made by means of a modulating switch 122 in the temperature line 76. Switch 122 is adapted to control a time-temperature recorder shown diagrammatically at 123 in FIG. 2. A line 124 may tie in the actual bale indicating marker of recorder 123 with rotation or other actuation of the press through switch 108. Thus, the temperature of the drying air may be correlated with each bale.

While we have shown our invention in but one form, it will be obvious to those skilled in the art that it is not so limited, but is susceptible of various changes and modifications without departing from the spirit thereof, and we desire, therefore, that only such limitations shall be placed thereupon as are specifically set forth in the appended claims.

What we claim is:

1. The process of moisture conditioning seed cotton which comprises the steps of,
    (a) passing the cotton into operative relation to a first moisture sensing means,
    (b) subsequently passing the cotton through a drying system,
    (c) subsequently passing the cotton into operative relation to a second moisture sensing means located outside of the drying system and
    (d) utilizing a combination of signals obtained from the sensing means set forth in (a) and (c) above to control the amount of moisture removed from the cotton while in said drying system.

2. The process of claim 1 comprising the further step of manually selecting the desired predetermined range of moisture content.

3. The process of claim 1 in which hot air is passed into contact with the cotton in the drying system, obtaining a signal corresponding to the drying requirement of the cotton prior to leaving the drying system by determining the temperature of the air after it has contacted the cotton and utilizing said signal to modify the combination of signals obtained by the means set forth in (a) and (c) of claim 1.

4. The process of drying seed cotton approximately to a predetermined range of moisture content comprising,
    (a) passing the cotton through a drying system,
    (b) sensing the drying requirement of the cotton prior to leaving the drying system,
    (c) sensing the moisture content of the cotton after it has passed through the drying system, and
    (d) utilizing a combination of the signals obtained in (b) and (c) above to regulate the amount of moisture removed by the drying system.

5. The process of claim 4 in which hot air is passed into contact with the cotton in the drying system, in which the drying requirement of the cotton prior to leaving the drying system is sensed by determining the temperature of the air after it has contacted the cotton, and utilizing said signal to modify the combination of signals obtained in (b) and (c) of claim 4.

6. The process of drying seed cotton approximately to a predetermined range of moisture content comprising,
    (a) passing the cotton through a hot air drying system,
    (b) sensing the drying requirement of the cotton prior to leaving the drying system by determining the temperature of the air used to dry the cotton therein,
    (c) sensing the drying requirement of the cotton prior to entering the drying system in terms of the electrical properties of the cotton as affected by its moisture content,
    (d) sensing the drying requirement of the cotton after passing through said drying system in terms of the electrical properties of the cotton as affected by its moisture content, and
    (e) utilizing a combination all of the signals obtained in (b), (c), and (d) above to regulate the amount of moisture removed from the cotton by the drying system.

7. The process of drying seed cotton substantially to a predetermined range of moisture content which comprises,
    (a) passing the cotton in a substantially continuously moving stream through a hot air drying system having means associated therewith to put heat thereinto,
    (b) sensing the moisture content of the cotton adjacent the point of entry into the drying system,
    (c) sensing the temperature of the air which has been used to dry the cotton,
    (d) sensing the moisture content of the cotton adjacent the point of exit from the system, and
    (e) utilizing a combination of the signals obtained in (b), (c), and (d) above to control the amount of moisture removed from the cotton by regulating the heat input to the drying system.

8. The process of claim 7 in which the signals obtained in (b) and (d) of claim 7 are cumulatively used to control the heat input to the system and in which the signal obtained in (c) of claim 7 is utilized to decrease the heat input to the system.

9. Apparatus for drying seed cotton substantially to a predetermined range of moisture content comprising,
    (a) means to pass the cotton through a hot air drying system,
    (b) a first signal emitting sensor located in position to sense the moisture content of the cotton prior to entering the drying system,
    (c) a second signal emitting sensor located in position to sense the moisture content of the cotton after it is passed through the drying system,
    (d) means to modify the signal obtained from the first sensor by the signal obtained from said second sensor, and
    (e) means to regulate the amount of heat supplied to the drying system in accordance with the modified signal obtained in (d) above.

10. The apparatus of claim 9 in which,
    (a) the signal emitting sensors are of the type to sense the moisture content of the cotton in terms of the electrical properties of the cotton as such properties are affected by the moisture content,
    (b) means to convert the signals derived from the means in (a) above to a pneumatic signal, and
    (c) means to utilize the pneumatic signal to regulate the amount of heat supplied to the drying system.

11. The combination with a cotton drying system embodying a hot air dryer, ducts through which the cotton is delivered to and from the dryer and a heater for supplying heat to the dryer of (a) means located in the system ahead of the dryer to sense the moisture content of the cotton, (b) means located in the system behind the dryer to sense the moisture content of the cotton, (c) means through which the signals from (a) and (b) above are fed and effective to translate said signals into a common output signal which is representative of the heat input required to bring the moisture content of the cotton within a predetermined narrow range, and (d) means effective to utilize the signal derived from the means set forth in (c) above to control the amount of heat supplied by the heater to the dryer.

12. The apparatus of claim 11 including means located in the system behind the dryer effective upon the absence of a flow of cotton into the dryer to nullify the signal from the means set forth in (a) of claim 11.

13. The apparatus of claim 11 including means located in the system behind the dryer effective upon the absence of a flow of cotton from the dryer to maintain substantially the signal obtained from the means set forth in (b) of claim 11 when the cotton has flowed from the dryer.

14. The combination of claim 11 including means located between the sensing means set forth in (a) and (b) of claim 11 and effective to sense the temperature of the moisture-laden air from the cotton, and means to feed a signal from the temperature sensing means to the common signal means set forth in (c) of claim 11 and which diminishes the value of said common output signal.

15. The combination of claim 14 including a signal carry means for sensing means (a) and (b) of claim 11 and means manually to block said signal carry means, whereby the heat supplied by the dryer may be determined solely by the signal derived from the temperature sensing means.

16. The combination with a cotton gin plant embodying a hot air dryer, a gin stand, and a double box balling press, of (a) means to deliver to the gin stand cotton which is passed through the dryer and which has a moisture content within a predetermined range, (b) power actuated means operable to record the moisture content of each bale of cotton passing through the plant, and (c) means operable upon actuation of the press to actuate said power driven recording means, whereby the moisture content at which each bale of cotton was ginned is correlated to each particular bale.

17. Apparatus for drying seed cotton substantially to a predetermined range of moisture content which comprises, (a) means to pass the cotton through a hot air drying system, (b) a first signal emitting sensor located in position to sense the moisture content of the cotton prior to entering the drying system, (c) a second signal emitting sensor located in position to sense the moisture content of the cotton after it has passed through the drying system, (d) a manually controllable signal emittor, (e) means to produce an intermediate signal that increases and decreases at a rate proportional to the difference between the signal obtained from said second sensor and the signal obtained from said manually controllable emittor, (f) means to modify the signal obtained from said first signal means by said intermediate signal, and (g) means to regulate the amount of heat supplied to the drying system in accordance with the modified signal obtained in (f) above.

18. The combination with a cotton gin plant embodying a hot air dryer, a gin stand, and a double box bailing press, of (a) means to deliver to the gin stand cotton which has passed through the dryer and which has a moisture content within a predetermined range, (b) power actuated means operable to record the temperature at which each bale of cotton passing through the plant was dried, and (c) means operable upon actuation of the press to actuate said power driven recording means, whereby the temperature at which each bale of cotton was dried is correlated to each particular bale.

References Cited by the Examiner

UNITED STATES PATENTS

| | | | |
|---|---|---|---|
| 1,826,247 | 10/1931 | Heppenstall | 34—89 X |
| 2,548,943 | 4/1951 | Burdick | 74—1 |
| 2,968,874 | 1/1961 | Fishburn | 34—48 |
| 3,111,398 | 11/1963 | Jones | 34—48 X |
| 3,114,613 | 12/1963 | Neitzel et al. | 34—48 |

FREDERICK L. MATTESON, Jr., *Primary Examiner.*

JOHN J. CAMBY, *Examiner.*